United States Patent [19]

Long

[11] 4,286,386
[45] Sep. 1, 1981

[54] ELECTRO-MECHANICAL DISPLACEMENT MEASURING DEVICE

[76] Inventor: Irvin E. Long, R.R. 1 Box 175, Wheatfield, Ind. 46392

[21] Appl. No.: 70,485

[22] Filed: Aug. 28, 1979

Related U.S. Application Data

[63] Continuation-in-part of Ser. No. 830,701, Sep. 6, 1977, abandoned.

[51] Int. Cl.$^3$ .............................................. G01B 7/02
[52] U.S. Cl. ................................... 33/138; 33/143 L; 172/430; 214/1 MD
[58] Field of Search ................. 92/5 R; 91/1; 60/328; 172/430; 318/565; 340/177 R, 177 VA; 33/138, 139, 140, 143 L, 147 N, 333

[56] References Cited

U.S. PATENT DOCUMENTS

| | | | |
|---|---|---|---|
| 2,589,896 | 3/1952 | Toland | 72/430 |
| 2,772,411 | 11/1956 | Cooper | 33/333 |
| 2,851,014 | 9/1958 | Healy | 121/148 |
| 2,934,938 | 5/1960 | Rhoades | 73/3 |
| 3,160,836 | 12/1964 | Farley | 92/5 R |
| 3,271,564 | 9/1966 | Rosenfeld et al. | 33/138 |
| 3,500,547 | 3/1970 | Van Haagen | 33/143 L |
| 3,553,842 | 1/1971 | Gerber et al. | 33/138 |
| 4,071,957 | 2/1978 | Sumption et al. | 33/138 |
| 4,205,453 | 6/1980 | Steele | 33/139 |

*Primary Examiner*—Richard R. Stearns
*Attorney, Agent, or Firm*—Charles S. Penfold

[57] ABSTRACT

A displacement measuring device is disclosed that is particularly useful for measuring and remotely indicating the displacement of a piston rod relative to the cylinder of a power actuator of an earth working implement. The device includes a variable resistor controlled by a gearless actuator connected with the piston rod so that the effective resistance of the resistor is varied depending upon the axial displacement of the piston rod relative to the cylinder. An indicator is connected by electrical circuitry with the variable resistor to display the amount of piston rod displacement relative to the cylinder. A plurality of embodiments of the device are disclosed with one disclosed embodiment including a cable wound about a pulley mounted on the rotatable control shaft of the variable resistor with the cable having one end fastened to the piston rod and a retraction spring to maintain the cable taut regardless of piston displacement in either axial direction. The other disclosed embodiments include a linear resistant element mounted on either the cylinder or the piston rod with a wiper arm engaging the resistance element so that the effective resistance is varied depending upon the amount of piston rod displacement relative to the cylinder and a cylinder mounted pivotable first rod pivoted by a second rod mounted on the piston rod so that pivoting of the first rod in one direction causes a finger to be pivoted to rotate the control shaft of a variable resistor to thus vary the effective resistance of the resistor.

5 Claims, 10 Drawing Figures

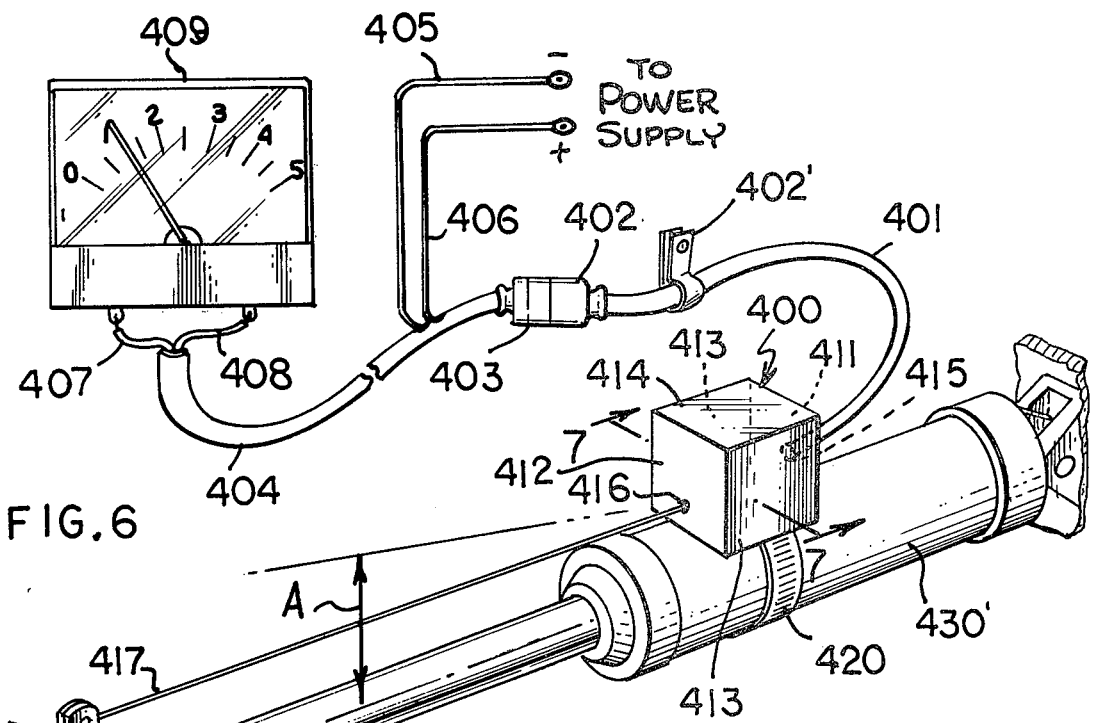
FIG. 6
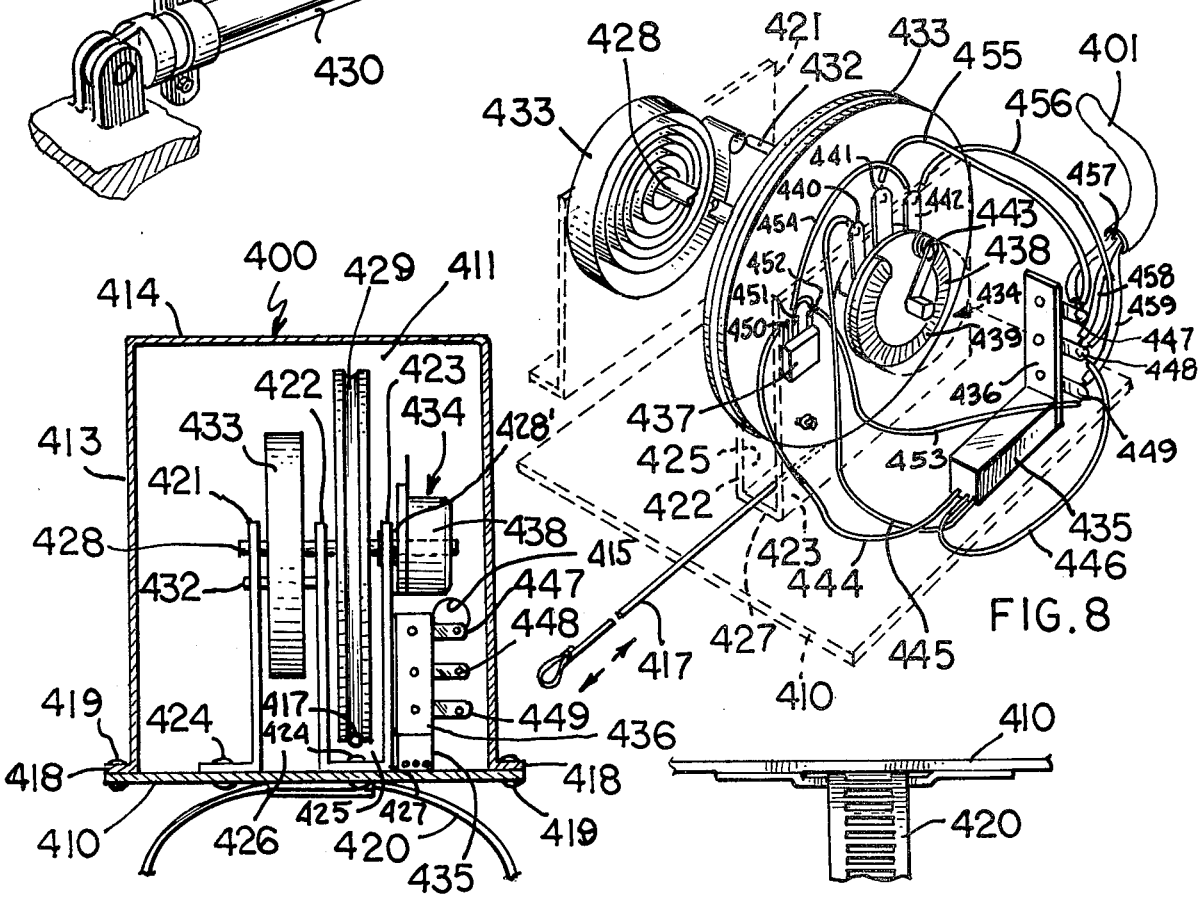
FIG. 7
FIG. 8
FIG. 9

ELECTRO-MECHANICAL DISPLACEMENT MEASURING DEVICE

This application is a continuation-in-part of application Ser. No. 830,701 filed Sept. 6, 1977, now abandoned.

FIELD OF THE INVENTION

This invention relates to a displacement measuring device and, more particularly, relates to an improved device for measuring and indicating the displacement of a movable member relative to a fixed member.

BACKGROUND OF THE INVENTION

It is oftentimes desirable to measure the displacement of a movable element relative to a related fixed element and to remotely indicate such displacement. Such can be the case, for example, where it is desirable to measure the displacement of a piston rod relative to the cylinder of a power actuator which can be utilized, again by way of example, on earth working implements such as plows or the like carried by a tractor carried by a road grader or the like.

Indicating devices have been heretofore suggested for indicating displacement of movable elements, including indicating displacement of a piston rod relative to the cylinder of a power actuator. Among such devices have been mechanical devices such as shown, by way of example, in U.S. Pat. Nos. 1,746,133; 3,077,179; 3,132,627; 3,275,174; 3,443,705; 2,704,047; 3,796,335; 3,883,021; and 3,900,073. In addition, stroke control of a piston is shown in U.S. Pat. No. 2,851,014.

Sensing of displacement of a movable element such as a piston has also been heretofore suggested in driven vehicles and such sensing has included, for example, the use of differential transformers or magnetic sensing (see, for example, U.S. Pat. Nos. 3,456,132; 3,956,973; 3,649,450; and 3,217,307).

In addition, sensing of movement of a movable element such as a piston, has also been sensed by mechanical means such as through the use of a ratchet and suitable other gearing (see, for example, U.S. Pat. Nos. 2,839,031 and 2,915,034) with the use of a ratchet and other gearing also having been heretofore suggested in conjunction with electrical circuitry for position indicating in U.S. Pat. Nos. 3,227,863 and 2,582,146, the latter of which also suggests the use of a variable resistance means in measuring water power.

Earth moving, or working, implements have heretofore been suggested having electro-mechanical indicating means for indicating the positioning of a blade or the like. Examples of such devices are shown in U.S. Pat. Nos. 3,512,589 and 2,972,194, the former of which includes switch controlled indicating lights and the latter of which includes a variable resistor the effective resistance of which is varied depending upon the blade cutting angle. In addition, earth working implements have also been heretofore suggested with indicating means that include a variable resistor the effective resistance of which is varied depending upon piston rod displacement of a power actuator (see, for example, U.S. Pat. No. 3,540,028).

Thus, while the prior art has suggested various types of electro-mechanical sensing devices including the use of variable resistors and associated circuitry for remotely indicating displacement of a piston rod relative to a cylinder of a power actuator, improvements in such electro-mechanical sensing devices are felt to be still possible.

SUMMARY OF THE INVENTION

This invention provides an improved electro-mechanical measuring device for measuring the displacement of a movable member relative to a fixed member and is particularly well suited for measuring piston rod displacement relative to the cylinder of a power actuator on an earth working implement.

According to the inventor:

"An Indiana farmer using a tractor and a pull type plow found that he spent as much time looking backward adjusting the plow as he did looking forward driving the tractor. It was obvious that as the hydraulic ram was extended or retracted, the plow was accordingly adjusted, and by placing an indicator on the tractor instrument panel, he would not need to look back as often. With the increase in size and length, implements have become increasingly hard to control. This is further aggravated by the fact that most tractors have a cab enclosure which restricts visibility. By using the subject invention, the operator or driver can make precise adjustments and have unlimited control of the implements he is using even though he cannot see them. The accessory assembly of the subject invention can be readily installed to hydraulic cylinders or units already owned.

The subject invention is used to indicate the position of a hydraulic ram and structures operable thereby. It converts the linear motion of the ram into an electrical signal with a corresponding read out on the instrument panel. When used on farm equipment, it provides a precise depth control monitor means.

The invention has a broad range of application. In fact, it need not be used with a hydraulic cylinder of actuator type assembly. It can be attached to any relatively movable objects where an indication of position is useful or meaningful; i.e., the travel of a rod or shaft in relation to a fixed member. A few of the suggested applications are: as an indicator of grain elevator chute door positions; to show the depth of cut on the blade of large earth moving equipment; to show the elevation of a dump truck bed as it is raised. Another application where this device can be used is to set the stroke limiting rods on a bolt bending machine even though a ram is not used.

Summarizing the objectives and advantages, it will be manifest that the invention promotes safe driving conditions for the driver as well as provides the remote control of tools or implements connected to or drawn by the tractor. The accessory allows the operator to have unlimited control of his equipment and the ability to make precise adjustment without leaving the operator's position. The unit is easily attachable to existing cylinders or actuators."

It is therefore an object of this invention to provide an improved electro-mechanical measuring device.

It is another object of this invention to provide an improved electro-mechanical measuring device for measuring the displacement of a movable member relative to a fixed member.

It is yet another object of this invention to provide an improved measuring device for measuring the displacement of a piston rod relative to the cylinder of a power actuator on an earth working implement.

It is still another object of this invention to provide an improved measuring device wherein one of a variable resistance means and a gearless actuating means is aligned with and extends along a movable member for a substantial distance in accomplishing the desired end.

In view of the foregoing a very important object of the subject invention is to provide an accessory assembly having a housing which is readily attachable to a hydraulic unit, means connecting a rear part of a tractor to a front part of an implement supporting frame whereby a driver can ascertain the position of the frame and/or implement by reading an instrument or indicator forwardly of or adjacent to the driver without the necessity of his looking backwardly to determine its trailing elevation, thereby promoting the safety of the driver and efficient operation of the tractor, since the hydraulic unit in at least some installations currently in use are substantially concealed from view or are not readily visible and thereby requires a driver to lean rearwardly or sideways in precarious or dangerous positions to determine the position of the unit and/or a frame in accord with at least those installations presently known to the inventor which are currently available on the market.

Another significant objective of the invention is to provide a durable accessory assembly for the purpose described above in which certain mechanical and electrical components of the system in the housing are responsive to the operation of a hydraulic unit and that a wiring harness or insulated conductors afford a unique setup whereby these electrical components and the instrument can be readily operatively connected to a source of electrical energy. The housing serves to substantially protect the components therein and means are provided whereby to facilitate attachment of the housing to a cylinder of a hydraulic unit.

Attention is directed to the important fact that the complete accessory assembly is located externally of a hydraulic unit and is comprised of relatively few components or parts.

Attention is further directed to the important fact that the subject invention has proven to be very practical under all conditions of use and particularly so since a driver by merely observing the instrument can operate the hydraulic unit to obtain a correct positioning of the frame and/or implement to obtain uniformity in the work to be performed by the implement carried by the frame. This factor is particularly advantageous where, for example, the depth that an implement is to till or condition soil can be predetermined to obtain uniformity in the conditioning process.

Summarizing the objectives and advantages it will be manifest that the invention promotes safe driving conditions for a driver or operator of a tractor; improves uniformity in conditioning of soil; the disposition of certain relatively simple durable and reliable responsive components in a housing or box which is readily detachably connectible to the upper side of a rear extremity of a cylinder to facilitate installation and access to the components, as distinguished from any intricate or complicated controls which are concealed in a cylinder of a hydraulic unit and difficult to correctly assemble and disassemble.

With these and other objects in view, which will become apparent to one skilled in the art as the description proceeds, this invention resides in the novel construction, combination, and arrangement of parts substantially as hereinafter described, and more particularly defined by the appended claims, it being understood that such changes in the precise embodiments of the herein disclosed invention are meant to be included as come within the scope of the claims.

BRIEF DESCRIPTION OF THE DRAWINGS

The accompanying drawings illustrate complete embodiments of the invention according to the best mode so far devised for the practical application of the principles thereof, and in which:

FIGS. 6 through 10 are directed to disclosures substantially constituting structure or system in addition to that depicted in FIGS. 1 through 5:

More particularly, FIG. 6 is a diagramatic or pictorial view showing the accessory as applied to a hydraulic cylinder;

FIG. 7 is a transverse section taken substantially on line 7—7 of FIG. 6;

FIG. 8 is a perspective view illustrating the operative relationship or certain components of the accessory;

FIG. 9 is view showing means for facilitating attachment of the accessory assembly to power unit; and FIG. 10 is a schematic wiring diagram as utilized in the operation of the structure embodying the attributes of the subject invention.

DESCRIPTION OF THE INVENTION

Figure 1:
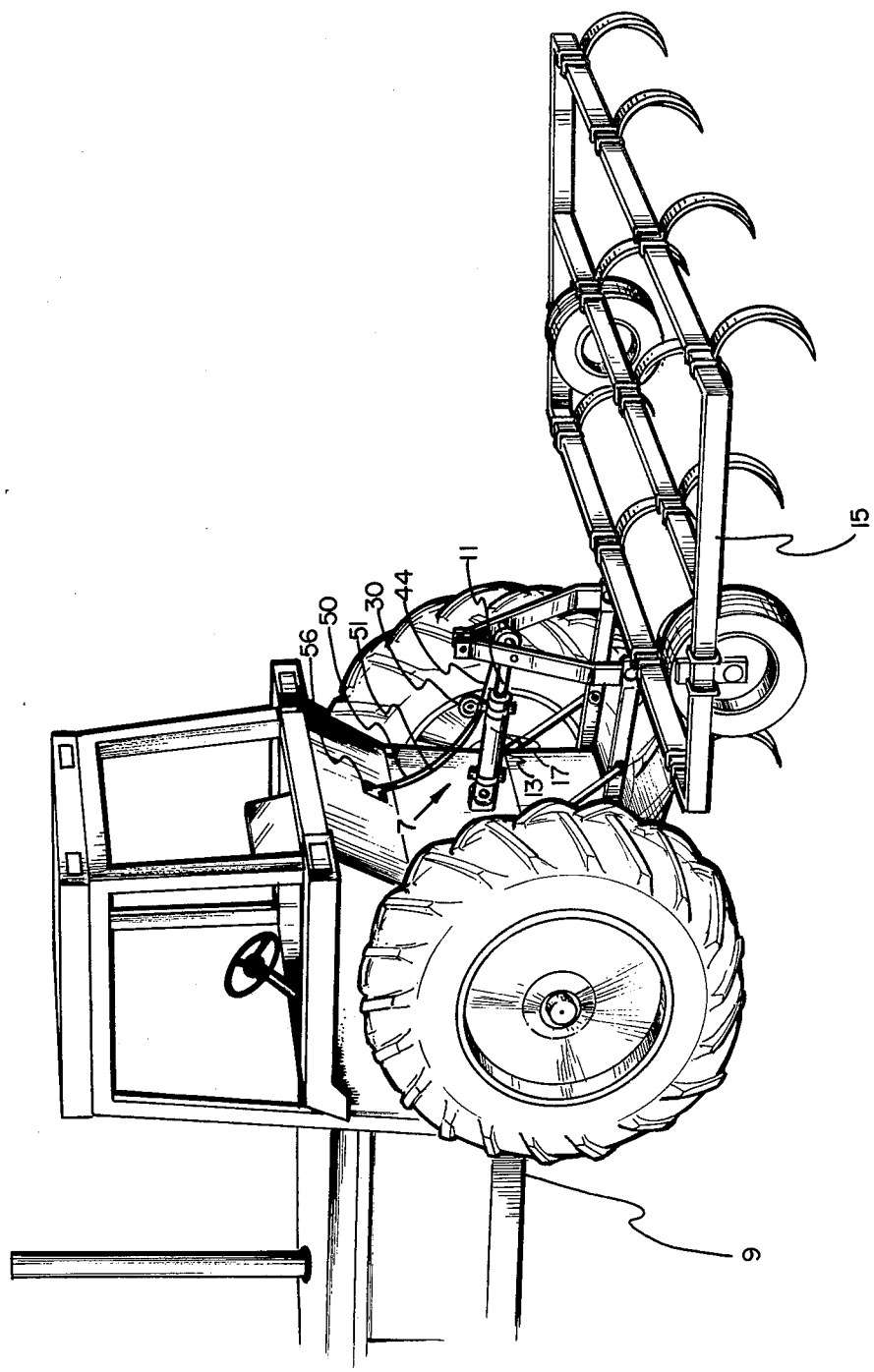
FIG. 1 is a perspective view showing the device of this invention mounted on a tractor with a remotely positioned indicator.

Referring now to the drawings, the numeral 7 refers generally to the measuring device as accessory assembly of this invention, shown in FIG. 1 mounted on a conventional tractor 9 to measure the displacement of piston rod 11.

As is well known, earth working implements (such as a tractor or road grader or the like), often have mounted thereon, one or more power actuators 13 to position a frame 15 for supporting working elements or implements (such as those shown in FIG. 1).

Such power actuators 13 conventionally include a cylinder 17 having a piston 19 therein that is movable in opposite axial directions within the cylinder by introduction of fluids (gas or liquid) into the cylinder under pressure through the desired one of the fluid inlets 21 and 22.

Piston 19 has piston rod 11 connected therewith so that the rod, or ram, is movable in opposite directions into and out of the cylinder depending upon piston movement within the cylinder, as is well known. Cylinder 17 has a clevis or means 24 at the end opposite to piston rod 11 for mounting the cylinder on tractor 9 in conventional fashion but at a lower rear part thereof. The other or rear end of rod 11 likewise has a clevis or means 26 thereon for mounting the rod to the structure to be positioned (ie, the frame 15, for example), again in conventional fashion.

Figure 2:
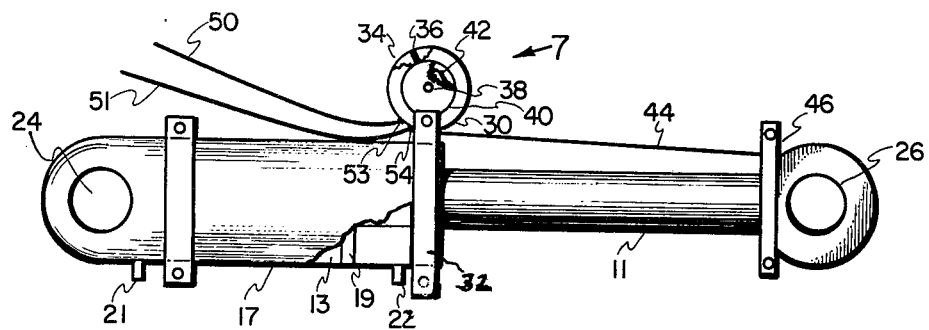
FIG. 2 is a side view of the preferred embodiment of the displacement measuring device of this invention.

The measuring device or accessory assembly of this invention is mounted between the fixed member (cylinder) and movable member (piston rod) to measure the displacement of the movable member relative to the fixed member. In the preferred embodiment shown in FIG. 2, a variable resistor 30 is mounted exteriorly on the upper side of a rear extremity of cylinder 17 by detachable connecting means such as a conventional clamp, or collar, 32. As is conventional, variable resistor 30 includes resistive element 34 and a wiper arm 36 which engages the resistance element with the positioning of the wiper arm determining the effective resistance of the resistor, as is well known. Wiper arm 36 is mounted on control shaft 38 so as to be rotatable therewith with shaft 38 extending from resistor 30 normal to the central axis of the cylinder (and hence normal to the opposite axial directions of movement of piston 11).

Control shaft 38 has a pulley 40 mounted thereon outwardly of the resistor and is provided with a retraction spring 42 biasing the shaft an pulley to rotative movement in one direction.

A cable or flexible element 44 is wound about pulley 40 in a direction so that the cable tends to wind about the pulley (rather than being biased for unwinding) and the outer end of cable 44 is fastened to means such as a collar 46 mounted on piston rod 11 outwardly of the cylinder and preferably near the means or clevis 26.

Electrical leads 50 and 51 are connected between connecting ears 53 and 54 on variable resistor 30 and indicator 56 which is remotely mounted and preferably mounted for easy viewing by the tractor operator. Indicator 56 may be conventional and indicates displacement depending upon the effective resistance of variable resistor 30 electrically connected therewith.

In operation, as piston rod 11 is moved, or displaced, relative to the cylinder by withdrawing the rod from the cylinder, cable 44 is pulled outwardly from the variable resistor to unwind the cable from pulley 40. This causes the control shaft 38 of the variable resistor to move wiper arm 36 in one rotative direction and thus changes the effective resistance of the resistor (for example, to increase the effective resistance). When the piston rod is moved in the opposite direction, ie, into cylinder 17, the cable is caused to be rewound on pulley 40 by retraction spring 42. This causes the control shaft 38 of the resistor to be rotated in the opposite direction and moves the wiper arm in the opposite direction to change the effective resistance of the resistor (for example, to decrease the effective resistance if movement in the first direction increased the effective resistance). Sensing of the effective resistance is then utilized in the indicator to indicate displacement by simple preadjustment of the dial and suitable calibration as would be obvious to one skilled in the art.

Figure 3:
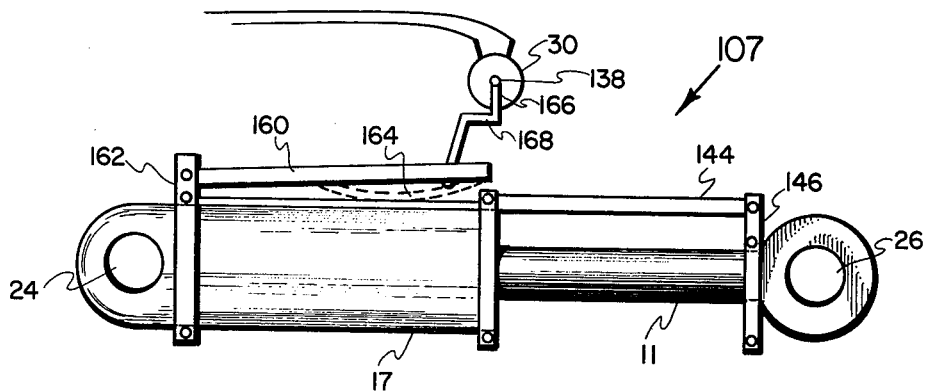
FIG. 3 is a side view of an alternate embodiment of this invention utilizing engageable arms and fingers.

In FIG. 3, the first alternate embodiment 107 of the measuring device is shown. In this embodiment, an arm 144 extends rearwardly from a collar 146 on piston rod 11 (and is preferably pivoted thereon) along and above piston rod 11 and cylinder 17 with an arm 144 extending outside the cylinder. A second arm 160 is mounted for pivotal movement in a substantially vertical path above cylinder 17 by a collar 162. As can be seen in FIG. 3, arm 160 is pivoted upwardly when arm 144 is moved rearwardly above the cylinder by retraction of piston rod 11 into cylinder 17, and allowed to pivot downwardly under the force of gravity when arm 144 is moved forwardly due to withdrawal of piston rod 11 from cylinder 17. If desired, a conventional shoulder 164 can be positioned on the underside of arm 160 to govern the rate of elevation or pivotal movement to be imparted to arm 160 due to movement of arm 144.

As shown in FIG. 3, variable resistor 30 is mounted above cylinder 17 and the control shaft 138 has a first finger 166 extending radially from control shaft 138 so as to be intregal with a finger 168 also mounted above cylinder 17 so as to be slidably connected with arm 160 and be pivoted thereby when arm 160 is pivoted upwardly. Finger 168 is contoured, as shown, so that the upward movement of arm 160 pivots finger 168 to move a finger 166 then engaging finer 168 and this rotates control shaft 138 a predetermined distance. This, of course, changes the effective resistance of resistor 30.

Figure 4:
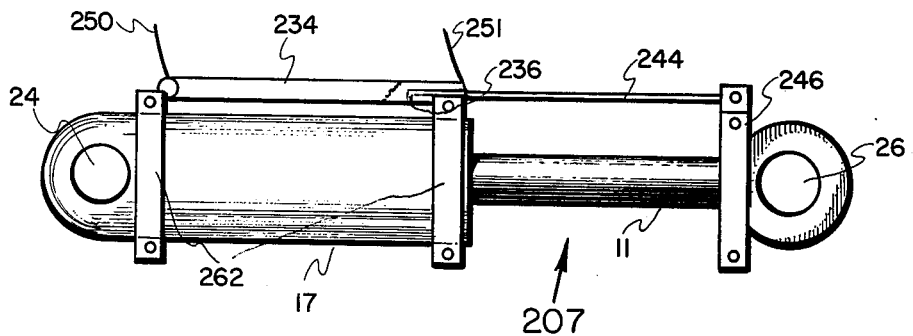
FIG. 4 is a side view of another alternate embodiment of this invention showing a linear resistance element mounted on the cylinder.

A second alternate embodiment 207 of the measuring device is shown in FIG. 4. In this embodiment, an arm 244 is mounted on a collar 246 (mounted on piston rod 11) with arm 244 extending rearwardly from collar 246 along and above piston rod 11 and cylinder 17. A linear, or straight line, resistive element 234 is mounted above cylider 17, as by collars 262, with the element extending along the cylinder so as to be engageable with a wiper arm 236 mounted on the rearwardly extending end portion of arm 244. As piston rod 11 is moved, the wiper arm 236 will engage a different portion of the resistive element so that the effective resistance that the resistor reflects on leads 250 and 251 will vary depending upon the positioning of the piston rod.

Figure 5:
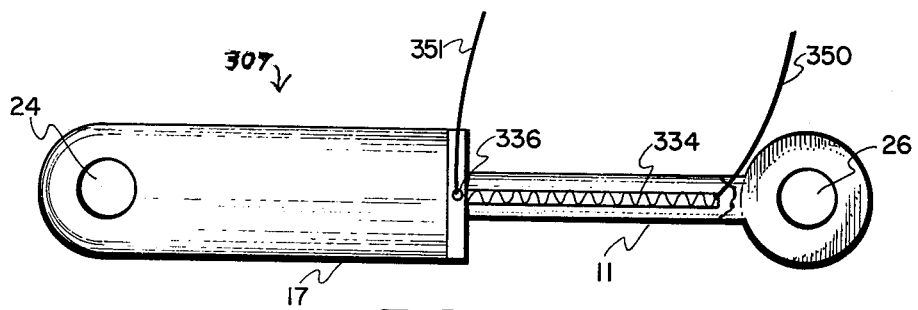
FIG. 5 is a side view of still another alternate embodiment of this invention showing a linear resistance element mounted in the piston rod.

A third alternate embodiment of the measuring device 301 is shown in FIG. 5. In this embodiment, a resistive element 334 is mounted in the piston rod 11 and extends rearwardly into cylinder 17. Wiper arm 336 is mounted in the front edge of the cylinder so as to engage the resistive element, the portion of the element then being engaged depending upon the positioning of the piston rod relative to the cylinder. The effective resistance of the variable resistor is thus directly determined by piston rod displacement relative to the cylinder and is indicated by coupling to the indicator through electrical leads 350 and 351.

As can be seen from the foregoing, this invention provides an improved measuring device for measuring the displacement of a movable element relative to a fixed element.

The following description is presented to supplement and/or amplify that which has been set forth above with respect to FIGS. 1 through 5 and is directed particularly to the disclosures in FIGS. 6, 7, 8, 9 and 10. In order to promote continuity in the description new numerals are employed to designate the majority of components illustrated.

Referring specifically to FIG. 6 there is illustrated an accessory assembly comprisng a housing or box generally designated 400 containing the mechanical and electrical components shown in FIGS. 7 and 8. The accessory also preferably includes a cable 401 containing conductors attached to a female plug 402, a male plug 403 connectible to the female plug and a cable 404 containing conductors 405 and 406 attachable to a source of electrical energy and to ground and conductors 407 and 408 connectible with an instrument 409 the latter of which is adapted for mounting at a remote location such as at the front of a driver for readily ascertaining the position of the implement supporting frame 15. The conductors and plugs may be considered to constitute a wiring harness and a fitting 402' is provided to assist in the installation of the accessory wherever desired. Obviously, the lengths of the cables 401 and 404 and conductors therein can be modified to suit different installation requirements.

The housing comprises a base plate 410, front and back opposed walls 411 and 412, a pair of side walls 413, and a top or cover 414. The front and back walls are respectively provided with openings 415 and 416 for respectively receiving the cable 401 and a flexible element 417. The terms front, back and side walls are merely relative and applicable only to their position with respect to a tractor. The lower portions of the aforesaid walls are preferably flanged as indicated at 418 in FIG. 7 and are secured to the base plate by any suitable means such as by rivets 419. The top 414 is preferably an integral portion of the housing or it can be a separate member sealably connected whereby to facilitate access to internal components in the housing. In any event access to the components in the housing can be obtained more readily as compared to certain prior art structures in which complicated electrical and mechanical components are intricately mounted in a hydraulic cylinder of a power unit. The housing may be mounted wherever desired but is preferably detachably connected externally to an upper side of a rear extremity of a power unit in an out of way position by any means suitable for the purpose but a pair of crossed flexible straps or members are preferably secured to the underside of the base plate whereby to facilitate a durable detachable wrap connection about a cylinder. Obviously, means other than a pair of straps with bolts or screws or the use of a single strap 420 as shown may be utilized.

Support means preferably in the form of upstanding substantially planar supports 421, 422 and 423 are fixedly connected by any suitable fastening means, such as rivets 424 to the base 410 to locate the supports in the housing and position them in a predetermined spaced parallel relationship to provide a pair of spaced formations 425 and 426. The supports 422 and 423 are joined together by a bottom wall 427 and provides the formation 425 and the support 421 in combination with the intermediate support 422 provide the formation 426. These supports are respectively provided with aligned apertures through which a control shaft 428 is rotatably mounted.

A pulley or member 429 is fixedly secured to the shaft 428 for rotation therewith in the formation 425 provided by the supports 422 and 423. The flexible element 417 extends through the opening 416 in the rear wall 412 of the housing and has an inner end connected to the pulley and an outer end connected to the outer rear end of a piston rod 430 of a cylinder 430' by a clamp 431 or other suitable means. The rear end of this rod is connectible with the implement supporting frame 15 and the fore end of the cylinder to the tractor 9 as described above or the cylinder can be mounted wherever desired contemplated by the invention. A stationary means preferably in the form of a pin or bridge member 432 is secured to the supports 421 and 422 of the support means and biasing means preferably in the form of a helical spring 433 is disposed in the formation 426 formed by the supports 421 and 422, with the inner and outer ends of the spring being respectively fixedly connected to the shaft 428 and to the pin 432 in a manner whereby when the piston rod 430 is extended the pulley 429 will be rotated and cause the flexible element 417 to unwrap from the pulley and rewrap itself on the pulley whenever the rod is retracted. Bearing means 428' is carried by the support 423 for rotatably supporting the shaft 428.

The accessory assembly also includes electrical means confined in the housing 400. The electrical means preferably comprises a potentiometer generally designated 434, a combined trimmer 435 and a junction block 436, and a voltage regulator 437. These components are operatively connected and are responsive to the rotation of the pulley or operation of the mechanical components described above.

The potentiometer 434 as depicted in FIGS. 7 and 8 preferably includes a casing 438 fixedly secured to the outside surface of the support 423 and contains a resistance coil 439 and is provided with three terminals 440, 441 and 442. An arm or contact 443 is fixed for movement with the shaft 428 and an outer end of the arm serves to frictionally engage the coil 439 in a conventional manner.

The trimmer 435 is of a conventional character, mounted on the base plate 410 and has three conductors 444, 445 and 446 extending therefrom and the junction block 436 is preferably supported in an upstanding position in relation to the trimmer and provided with three terminals 447, 448 and 449.

The voltage regulator 437 is of a conventional character and is preferably mounted on the support 423 and provided with three terminals 450, 451 and 452.

The conductor 444 extending from the trimmer is connected to the terminal 450 of the voltage regulator 437, the conductor 445 to the terminal 440 of the potentiometer 434 and conductor 446 to terminal 448 of the junction block 436. A conductor 453 connects the terminal 452 of the regulator with terminal 449 of the block, a conductor 454 connects the terminal 451 of the regulator and terminal 442 of the potentiometer and block, and a conductor 456 connects terminals 442 and 448 of the potentiometer and block, all of which is depicted in FIG. 8.

Figure 10:
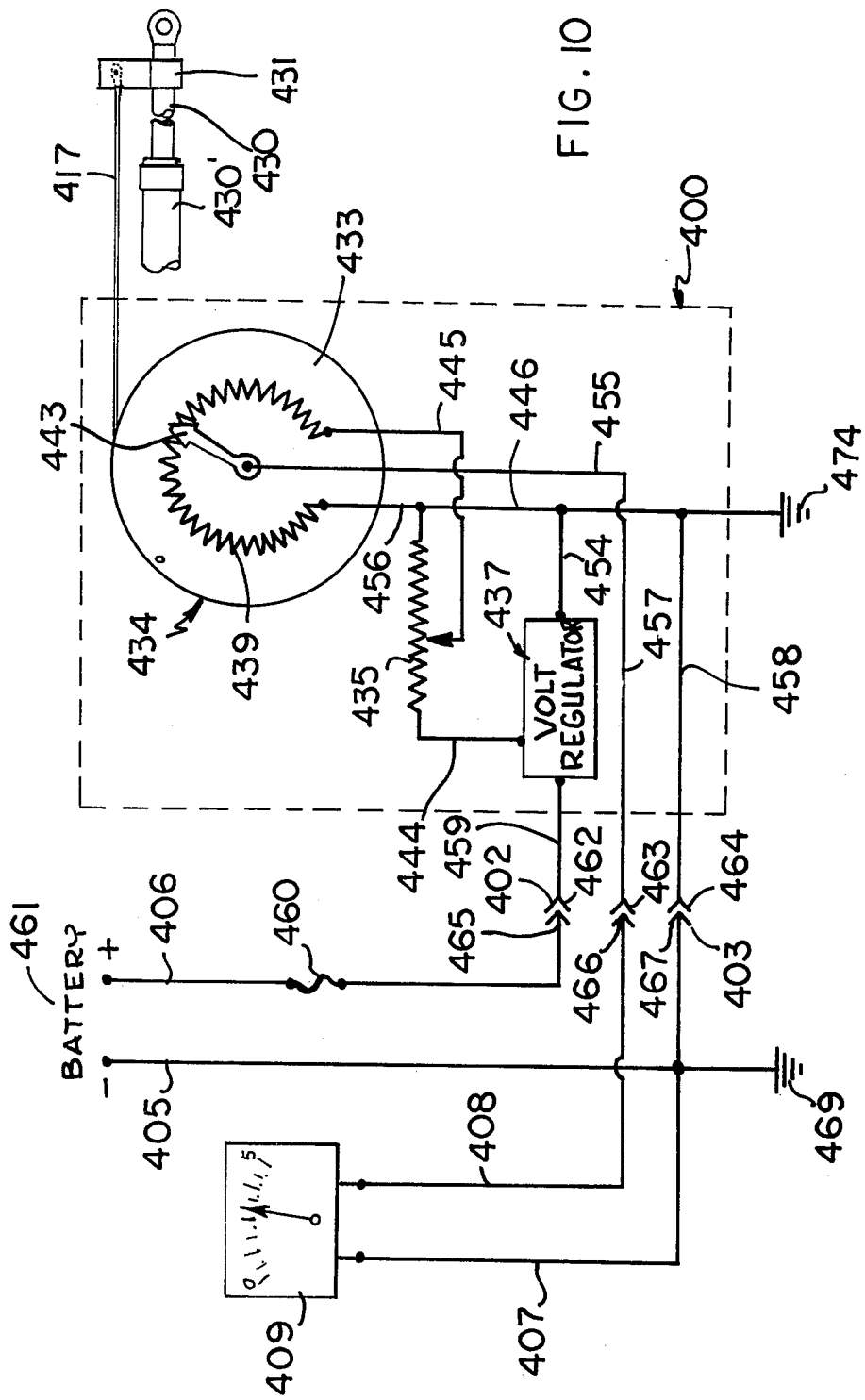

The cable 401 extending through the front opening 415 in the housing contains three conductors 457, 458 and 459 which are respectively connected to terminals 447, 448 and 449 of the junction block 436. As depicted in FIG. 10 a fuse 460 is interposed in conductor 406 which is not shown in FIG. 6.

Referring to the schematic drawing of the electrical system as depicted in FIG. 10 of the drawing, the electrical means defined in certain of the claims includes the potentiometer 434 of a 10K character, the voltage regulator 437 as alluded to above and an adjustable 10K resistor or tirmmer 435. These components are operatively connected and preferably mounted within the confines of the housing 400 indicated by the dotted lines. The electrical means is also operatively connected to a source of electricity such as a battery 461 and to the instrument or volt meter 409, the latter of which is preferably located an appreciable remote distance from the housing and is provided with suitable indicia or dial as shown to indicate the position of the reciprocable member 430 which is operable by the power unit or cylinder 430'. The source or battery may offer a voltage within a range of 8 to 30 volts DC. The schematic drawing is presented for clarity and a better understanding of the system and it does not include all of the terminals and conductors above referred to with respect to FIGS. 7 and 8.

The male and female connectors 403 and 402, above referred to, serve to provide a quick detachable connection between the components in the housing and the wiring harness which is connected to the battery 461 and instrument 409 in order to facilitate installation of the accessory assembly. The fuse 460 in the conductor 406 obviously serves to protect the electrical system.

The female plug 402 is provided with three terminals 462, 463 and 464 and the male plug with three terminals 465, 466 and 467 which respectively engage the terminals of the female plug. The conductor 406 from a positive side of the battery is connected to the terminal 465 and a conductor 405 from the negative side of the battery is connected to the conductor 407, the latter of which extends from the instrument 409 and is connected to the terminal 467 of the male plug. The other conductor 408 extending from the instrument is connected to the terminal 466. The conductors 407 and 405 are grounded as indicated at 469.

The wiring harness also includes three conductors 459, 457 and 458 which are respectively connected to the terminals 462, 463 and 464 of the female plug 402. A conductor 446 extends from one end of the coil 439 of the potentiometer and is connected to the conductors 454 and 458 and to ground 474. The conductor 457 is connected to the arm 443 of the potentiometer which is rotatable with the shaft 428 and responsive to the operation of the member 430. The voltage regulator 437 is interposed between lines 454 and 459. One part of the adjustable resistor or trimmer 435 is connected to the voltage regulator by a conductor or line 444 and another part to an opposite end of the coil 439 of the potentiometer by a conductor 445.

As to the operation the inventor states that:

"The source of electrical energy or the battery 461 provides a voltage anywhere from 8 to 30 volts DC. The in-line-fuse 460 serves to protect the electrical circuitry. The voltage regulator provides an output of 6 volts regulated DC voltage. This voltage is fed through the 10K Ohm adjustable resistor 435 where 5 volts DC are picked off and fed to the 10K Ohm potentiometer 434. In other words, the resistor controls and adjusts the amount of energy flowing to the potentiometer. When the potentiometer is operated by movement of the arm 443 which is actuated by the shaft 428 through the agency of the flexible element 417 and reciprocable member 430 of the power unit the resistance is changed or varied and this affects a change across the potentiometer (0-5 volts DC). The voltage change is fed to the instrument of position indicator 409 which is a 0-5 volt DC voltage meter which is preferably located in front of a driver for readability to determine how the power unit 430' should be operated to raise or lower the implement supporting frame."

It should be manifest that the operation of the potentiometer is responsive to the actuation of the reciprocable member 430; that the voltage regulator controls the amount of energy flowing to the resistor 435 and that the resistor controls and adjusts the voltage to the potentiometer and that the latter transmits its message to the instrument 409.

The foregoing system has proven to be very reliable, efficient and durable when subjected to all normal conditions of use, at least with respect to farm implements as described above, and does not involve the use of a multitude of intricate or complicated components or parts when compared with the electrical and mechanical systems disclosed in certain of the prior art patents related to remote indication.

Having thus described my invention, it is obvious that various modifications may be made in the same without departing from the spirit of the invention, and therefore, I do not wish to be understood as limiting myself to the exact forms, constructions, arrangements, and combinations of the parts herein shown and described.

I claim:

1. An electro-mechanical displacement measuring assembly for an apparatus having a fixed mechanical member and an elongated mechanical member movable in opposite directions, said assembly comprising a housing provided with a pair of openings and a base, means attached to said base whereby to facilitate connection of said housing to such a fixed member, support means disposed within the confines of said housing and carried by said base and being constructed to provide a pair of spaced formations, a rotatable shaft mounted on said support means and extending transversely into said formations, variable resistance means mounted on said support means and having a portion for varying the effective resistance of said variable resistance means, a pulley disposed in one of said formations and fixedly secured to said shaft for rotation therewith, a flexible element extending through one of said openings having an inner end connected to said pulley and an outer end for connection with such a movable member, means rotatable with said shaft for operating said variable resistance means in response to the movement of such a movable member, a helical spring disposed in the other of said formations having an inner end fixedly secured to said shaft and an outer end connected to said support means for atuomatically causing said flexible element to wrap itself about said pulley after reverse rotation of the latter, an instrument adapted for disposition at a location remote from said housing, and electrical circuitry extending through the outer of said openings in said housing and connecting said variable resistance means and said instrument and for connection with a source of electricity whereby said instrument will provide an indication of the axial displacement of such a movable member.

2. An accessory assembly for determining the operating position of a movable member, said assembly comprising structure forming a housing provided with a pair of openings, a top wall and a bottom wall, means secured to said structure whereby to facilitate attachment of the housing in a stationary relation to such a movable member, support means fixedly mounted on said bottom wall within the confines of said housing and comprising a pair of outer upstanding spaced portions and an intermediate portion between said pair, one of said outer portions and said intermediate portion being provided with aligned apertures, said one outer portion being provided with bearing means, a shaft journalled for rotation in said bearing and extending through said aligned apertures, a pulley fixedly secured to said shaft for rotation therewith arranged between said one outer portion and said intermediate portion, a flexible element extending through one of said openings having an inner end attached to said pulley and an outer end for attachment to such a movable member, stationary means interposed between said intermediate portion and the other outer portion, a helical spring also disposed between said other outer portion and said intermediate portion and having ends respectively secured to said shaft and said stationary means in a manner whereby when said flexible element is pulled outwardly by such a movable member it will unwind from said pulley and rewind thereon when such a member is retracted, electrical means mounted in said housing for operation in response to the movement of said shaft, an electrical instrument located remote from said housing, and electrical conductors extending through the other opening in said housing and being connected to said electrical means and said instrument and for connection with a soruce of electricity whereby said instrument will respond to the operation of said electrical means so that said instrument will indicate the positon of such a movable member.

3. An accessory assembly comprising a housing provided with a pair of openings and means for attaching it to a power unit having a stationary part and a reciprocable member utilized to raise and lower an implement trailably connected to a tractor, three upstanding spaced supports fixedly secured within the confines of said housing, aligned openings provided in a pair of adjacent supports, bearing means carried by one of said pair and a shaft journalled in said bearing means and extending through said aligned openings, a pulley fixedly secured to said shaft for movement between said pair of adjacent supports, a flexible element extending through one of the openings in said housing and having an inner end secured to said pulley and an outer end for connection to a rear end of such a reciprocable member, stationary means and a helical spring disposed between one of said adjacent supports and a third of said supports and having an inner end fixedly secured to said shaft and an outer end connected to said stationary means whereby to cause said element to wrap itself about said pulley when such a reciprocal member is retracted and unwrap when this member is extended, electrical means disposed in said housing operable in response to the movement of said pulley, an instrument adapted for disposition on a tractor in front of a driver, and electrical conductors extending through the other opening in said housing operatively connected to said electrical means and said instrument and for connection with a source of electricity whereby a driver can readily ascertain from said instrument whether such a power unit should be operated to raise or lower such an implement.

4. An accessory assembly comprising a housing having a base, wall structure secured to said base and provided with a pair of openings, means carried by said housing for fixedly detachably connecting it in relation to a reciprocable member of a power unit, support means disposed within the confines of said housing and affixed to said base, said support means comprising structure providing a pair of formations, bearing means carried by said support means, a shaft rotatable in said bearing means and extending transversely into said formations, a pulley disposed in one of said formations and affixed to said shaft for rotation therewith, a flexible element extending through one of said openings having an inner end attached to said pulley and an outer end for connection to such a reciprocable member, a helical spring disposed in the outer formation and having inner and outer ends respectively fixedly connected to said shaft and to said support means for causing said element to wrap itself about said pulley when such a reciprocable member is operated in one direction and unwrap when operated in an opposite direction, electrical means mounted in said housing and being responsive to the rotation of said pulley, an electrical instrument, and a cable extending through the outer opening in said housing and containing electrical conductors connected to said responsive means and for connection with a source of electricity and to ground whereby said instrument will respond to the operation of said electrical means and indicate the position of said reciprocable member.

5. The accessory assembly defined in claim 4, in which said electrical responsvie means includes a potentiometer, voltage regulator and a trimmer.

* * * * *